Sept. 1, 1936.	L. F. HOFER	2,052,770
REAR VIEW MIRROR
Filed Nov. 13, 1934

INVENTOR
L. F. HOFER
BY
ATTORNEY

Patented Sept. 1, 1936

2,052,770

UNITED STATES PATENT OFFICE 2,052,770

REAR VIEW MIRROR

Laurence F. Hofer, Portland, Oreg.

Application November 13, 1934, Serial No. 752,813

5 Claims. (Cl. 88—98)

This invention relates generally to the automotive industry, and particularly to rear view mirrors commonly employed in automobiles.

The main object of this invention is to facilitate night driving by enabling the driver to protect himself from the glare of following automobiles without detracting from the usefulness of the rear view mirror.

The second object is to provide an improved form of rear view mirror affording the usual adjustment for normal driving position and an additional adjustment which may be easily made for the purpose of varying the inclination of the mirror a very limited amount, that is, only sufficient to reflect the beam from a following headlight above the eye of the driver when in its normal driving position, and at the same time enabling him to rise sufficiently in the seat to utilize the mirror for rear view purposes.

The second object is to so construct the mirror that it may be moved to or from a given adjustment without looking at the mirror or otherwise detracting the driver's attention other than to simply move a lever to the right or to the left as the case may be.

These, and other objects, will become more apparent from the specification following as illustrated in the accompanying drawing, in which.

Similar numbers of reference refer to similar parts throughout the several views.

Figure 1:
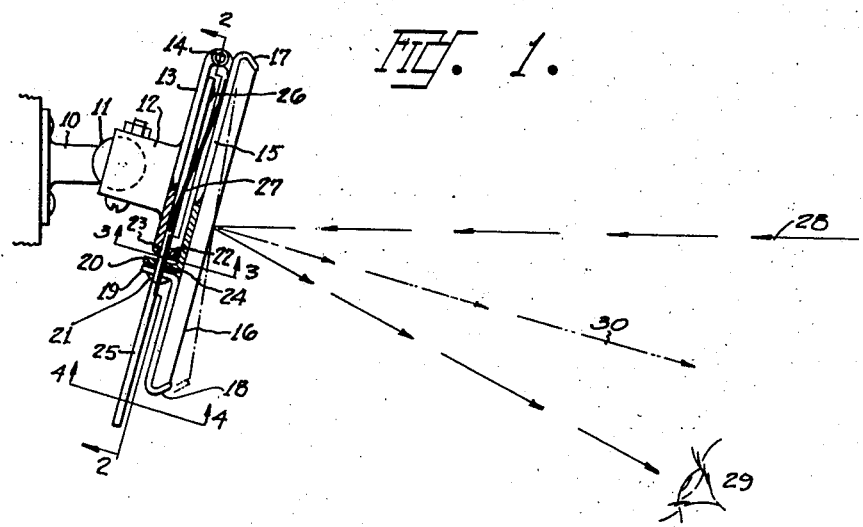
Fig. 1 is a side elevation of the device with parts broken away in vertical section.
Figure 2:
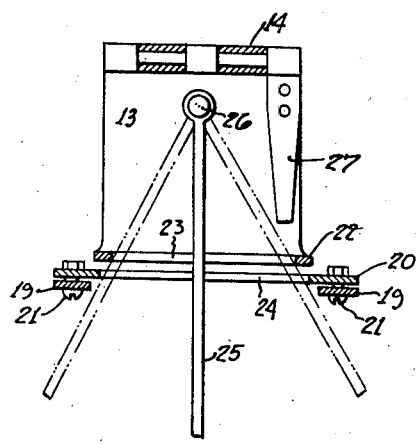
Fig. 2 is a section taken along the line 2—2 in Fig. 1.
Figure 3:
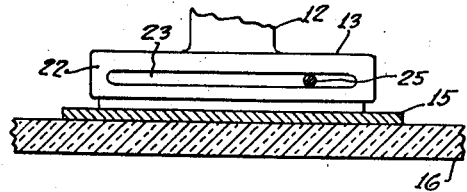
Fig. 3 is a section taken along the line 3—3 in Fig. 1.
Figure 4:
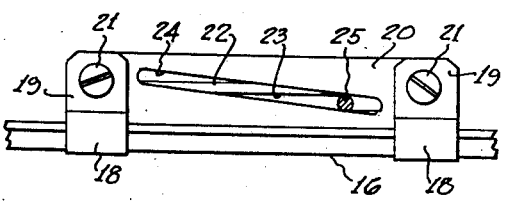
Fig. 4 is a sectional view taken along the line 4—4 in Fig. 1.
Figure 5:
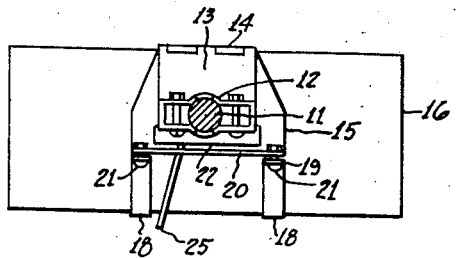
Fig. 5 is a rear view of the device.

Referring in detail to the drawing, there is shown a common form of bracket 10 having a ball end 11 and capable of being secured above the windshield of an automobile. Associated with the ball end is a common form of friction clamp 12 which is disposed on the rear side 13 of a hinged base 14.

To the front side 15 of the base 14 is attached a mirror 16. The mirror 16 is held between the fingers 17 which are formed on the side 15 and the fingers 18 which are provided with inturned lugs 19 which, in turn, are attached to the flange 20 of the front 15 by means of the screws 21.

The rear side 13 is provided with a forwardly turned flange 22 containing a slot 23, while the flange 20 contains the diagonal slot 24. A lever 25 is hinged to the back 13 by means of a rivet 26. The lever 25 passes through both of the slots 23 and 24. A leaf spring 27 urges the hinged base 14 toward an open position whose function is mainly to prevent rattling.

In the operation of this device the clamp 12 engages the ball end 11 and permits the mirror 16 to be tilted to a normal driving position, that is to say, so that the line of sight 28 will pass through the rear window and be reflected by the mirror 16 to the eye 29 of the driver. In this position the lever 25 is at the end of the inclined slot 24 which is nearest the mirror 16. If, then, the light from a following automobile should be reflected back into the eye of the driver it is only necessary for him to move the lever 25 toward the opposite end of the slot 24, causing the mirror 16 to assume the position shown in dotted lines in Fig. 1, in which event the rays will be reflected along the line 30 instead of into the eye 29.

It is obvious that numerous mechanisms could be employed to accomplish the adjustment herein referred to and that the details of construction could be otherwise varied without departing from the spirit of this invention.

I am aware that numerous forms of rear view mirrors have been constructed for automobiles, and it is therefore not my intention to cover such devices broadly, but I do intend to cover all such forms and modifications thereof as fall fairly within the appended claims.

I claim:

1. A rear view mirror having a support for mounting same in a vehicle and for moving same out of or back to a normal position wherein the driver's line of sight will pass through the rear window of the vehicle consisting of a friction clamp for holding the mirror in a normal position, a hinged connection between said mirror and clamp, a slotted flange attached to said mirror, said slot being inclined with relation to the plane of the mirror and a lever pivotally joined to the clamp and extending through said slot.

2. A rear view mirror having a support for mounting same in a vehicle and for moving same out of or back to a normal position wherein the driver's line of sight will pass through the rear window of the vehicle consisting of a friction clamp for holding the mirror in a normal position, a hinged connection between said mirror and clamp, a slotted flange attached to said mirror, said slot being inclined with relation to the plane of the mirror, a lever pivotally joined to the clamp and extending through said slot and a spring for urging said lever against one side of said slot.

3. A rear view mirror having a support for mounting same in a vehicle and having a friction clamp on said support for holding the mirror in an adjusted position for normal driving, means for hinging said mirror to said friction clamp, a lever pivotally connected to said friction clamp adapted to move in a plane substantially parallel to said mirror, a slotted member attached to said mirror having the slot thereof inclined with relation to the mirror through which slot said lever projects and whereby a swinging movement of the lever in a plane parallel to the mirror will cause a variation in the inclination of the mirror.

4. A rear view mirror for automobiles having in combination a base consisting of a pair of hingedly connected sides, a mirror secured to one of said sides, a friction clamp secured to the other side, the mirror supporting portion of said base having a cam formed therein consisting of a slotted member normal to said mirror and having the slot thereof inclined with relation to the mirror face, a lever hinged to the side of said base to which said clamp is secured extending through said slotted cam and capable of swinging in a plane substantially parallel to the mirror whereby a lateral movement of said lever in a plane spaced from the mirror plane will cause said mirror to incline slightly away from its former position.

5. A rear view mirror having in combination a bracket adapted to be mounted in a vehicle, a base consisting of a pair of hingedly connected leaves having one of said leaves frictionally attached to said bracket, a mirror secured to the opposite leaf, a slotted flange forming a part of the mirror supporting leaf and having the slot thereof inclined with relation to the mirror plane, a lever pivotally attached to the other leaf of said base and extending through said slot, the inclination of said slot with relation to the face of the mirror being small in relation to the angle of movement of the lever whereby a relatively large movement of said lever will cause a small variation in the inclination of the mirror.

LAURENCE F. HOFER.